US010840994B2

United States Patent
Ashiwal et al.

(10) Patent No.: US 10,840,994 B2
(45) Date of Patent: Nov. 17, 2020

(54) SYSTEMS AND METHODS FOR OPPORTUNISTIC ANTENNA SELECTION

(71) Applicant: Apple Inc., Cupertino, CA (US)

(72) Inventors: Vijendrakumar K. Ashiwal, San Jose, CA (US); Dikshit Garg, San Jose, CA (US); Vijay Gadde, San Jose, CA (US); Sharad Garg, Cupertino, CA (US); Jia Tang, San Jose, CA (US); Zhu Ji, San Jose, CA (US); Mohit Narang, Cupertino, CA (US); Tiberiu Muresan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 16/136,031

(22) Filed: Sep. 19, 2018

(65) Prior Publication Data
US 2020/0091989 A1 Mar. 19, 2020

(51) Int. Cl.
*H04W 36/00* (2009.01)
*H04B 7/08* (2006.01)
*H04W 36/30* (2009.01)
*H04B 7/0404* (2017.01)

(52) U.S. Cl.
CPC ........... *H04B 7/082* (2013.01); *H04B 7/0404* (2013.01); *H04W 36/0016* (2013.01); *H04W 36/30* (2013.01)

(58) Field of Classification Search
CPC ...... H04W 36/30; H04W 36/14; H04W 36/34
See application file for complete search history.

(56) References Cited

U.S. PATENT DOCUMENTS

| | | | |
|---|---|---|---|
| 9,961,600 | B2 | 5/2018 | Gopal et al. |
| 10,291,310 | B1* | 5/2019 | Gopal .................. H04B 7/0817 |
| 2006/0073829 | A1* | 4/2006 | Cho ...................... H04W 36/14 |
| | | | 455/439 |
| 2011/0250926 | A1* | 10/2011 | Wietfeldt ................. H01Q 3/24 |
| | | | 455/525 |
| 2018/0062718 | A1 | 3/2018 | Clevorn et al. |
| 2018/0255472 | A1* | 9/2018 | Chendamarai Kannan ................. |
| | | | H04W 72/0453 |

FOREIGN PATENT DOCUMENTS

WO 2018063494 A1 4/2018

* cited by examiner

*Primary Examiner* — Shantell L Heiber
(74) *Attorney, Agent, or Firm* — Fletcher Yoder, P.C.

(57) ABSTRACT

The present disclosure relates to opportunistically selecting an antenna in an electronic device having multiple antennas. A baseband processor of the electronic device may connect to a first cellular tower providing cellular service at a first frequency using a first antenna of the electronic device. The baseband processor may then receive an indication of a handover event to a second cellular tower operating at a second frequency. The baseband processor may determine signal measurements of the second cellular tower for each antenna of the electronic device that is capable of operating at the second frequency. The baseband processor may execute a handover to the second cellular tower using the antenna associated with the best performing signal measurements. In this manner, an antenna may be opportunistically selected based on performance of the antenna, improving operation of the electronic device and quality of cellular service.

20 Claims, 8 Drawing Sheets

SYSTEMS AND METHODS FOR OPPORTUNISTIC ANTENNA SELECTION

BACKGROUND

The present disclosure relates generally to antenna usage in cellular telephone technology and, more particularly, to opportunistically selecting an antenna in a cellular telephone having multiple antennas.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Cellular telephones, which may also be referred to as cell phones, may have multiple antennas that are capable of operating on a variety of frequency bands. A cell phone may undergo a handover event when the cell phone enters an area or cell of a cell network where cell service is provided by more than one cell tower. For example, a user may be operating the cell phone, and travel from a first cell where cell service is provided by a first cell tower to a second cell where cell service is provided by a second cell tower. The first cell tower may provide cell service at a first frequency, while the second cell tower may provide cell service at a second frequency. The cell phone may use a first antenna that operates at the first frequency when in the first cell. The cell phone may have multiple antennas that are capable of operating at the second frequency.

In many cases, when the cell phone undergoes the handover event, and the first antenna cannot operate at the second frequency, one of the multiple antennas that are capable of operating at the second frequency is selected arbitrarily to use the cell service provided by the second cell tower. However, one of the other multiple antennas that are capable of operating at the second frequency may provide better performance than the arbitrarily selected antenna. Moreover, when the cell phone undergoes the handover event, and the first antenna can operate at the second frequency, the cell phone may continue operating using the first antenna, even when one of the other multiple antennas that are capable of operating at the second frequency may provide better performance than the first antenna.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to opportunistically selecting an antenna in a cell phone having multiple antennas. In particular, a baseband processor of a cell phone may connect the cell phone to a first cell tower providing cell service at a first frequency using a first antenna of the cell phone. The baseband processor may then receive an indication of a handover event to a second cell tower operating at a second frequency. The baseband processor may determine a set of signal measurements of the second cell tower for each antenna of the cell phone that is capable of operating at the second frequency. The baseband processor may execute a handover to the second cell tower using the antenna associated with the best performing signal measurements. In this manner, an antenna of the cell phone may be opportunistically selected based on performance of the antenna with a cell tower that cell service is being handed over to, improving operation of the cell phone and quality of cell service.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Cellular telephones, also sometimes referred to as cell phones, may have multiple antennas that are capable of operating on a variety of frequency bands. A cell phone may undergo a handover event when the cell phone enters an area or cell of a cell network where cell service is provided by more than one cell tower. For example, a user may be operating the cell phone, and travel from a first cell where cell service is provided by a first cell tower to a second cell where cell service is provided by a second cell tower. The first cell tower may provide cell service at a first frequency, while the second cell tower may provide cell service at a second frequency. A baseband processor of the cell phone may use a first antenna that operates at the first frequency when in the first cell. The cell phone may have multiple antennas that are capable of operating at the second frequency.

The baseband processor may then receive an indication of a handover event to the second cell tower operating at a second frequency. The baseband processor may determine a set of signal measurements of the second cell tower for each antenna of the cell phone that is capable of operating at the second frequency. The baseband processor may execute a handover to the second cell tower using the antenna associated with the best performing signal measurements. It should be understood that references to the "set of signal measurements" and "signal measurements" may include one or more signal measurements. In this manner, an antenna of the cell phone may be opportunistically selected based on performance of the antenna with a cell tower that cell service is being handed over to, improving operation of the cell phone and quality of cell service. It should be noted that while the disclosed techniques are discussed with relation to cellular technology (e.g., cellular networks, cellular phones, and cellular towers), the disclosed techniques may be applicable to any suitable type of communication technology (and associated communication networks, communication devices, and communication gateways).

Figure 1:
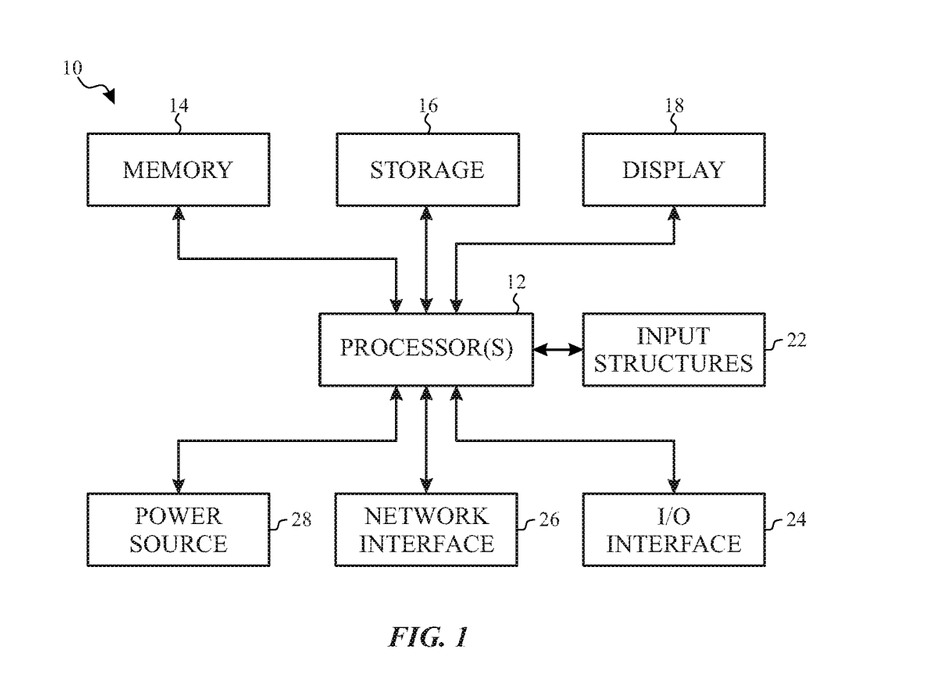
FIG. 1 is a schematic block diagram of an electronic device that dynamically adjusts a title in a donut chart based on an adjustment to the donut chart, according to embodiments of the present disclosure.
Figure 2:
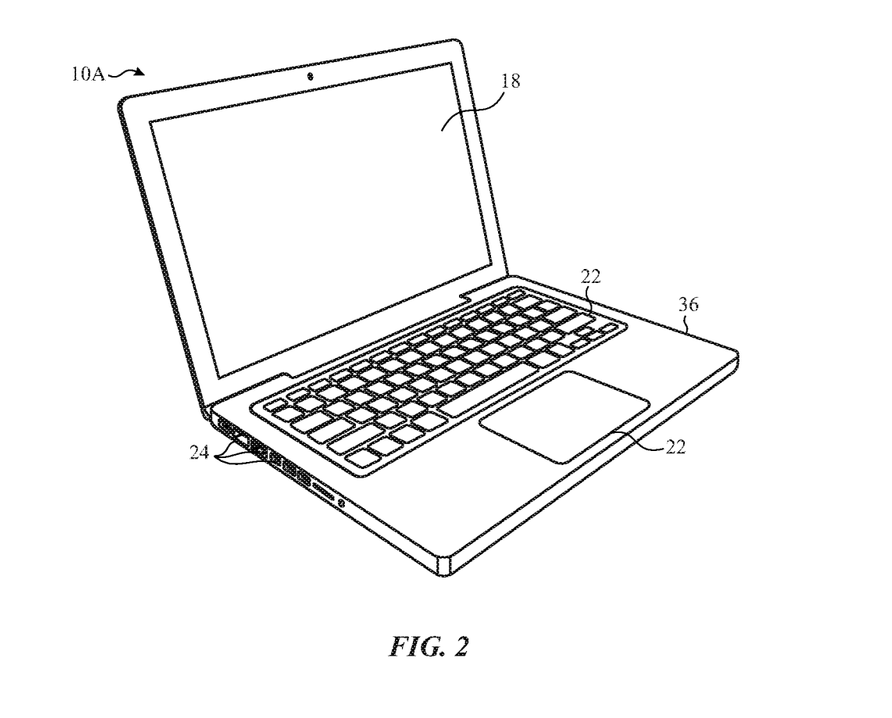
FIG. 2 is a perspective view of a notebook computer representing an embodiment of the electronic device of FIG. 1.
Figure 3:
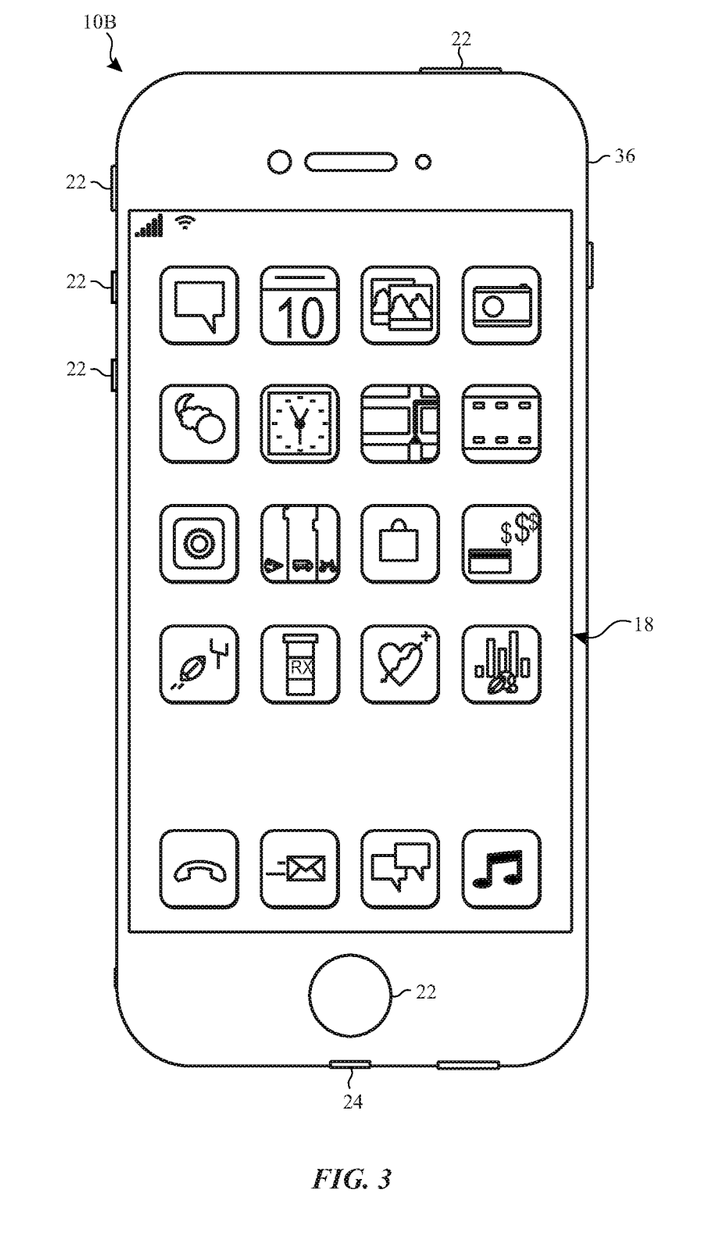
FIG. 3 is a front view of a hand-held device representing another embodiment of the electronic device of FIG. 1.
Figure 4:
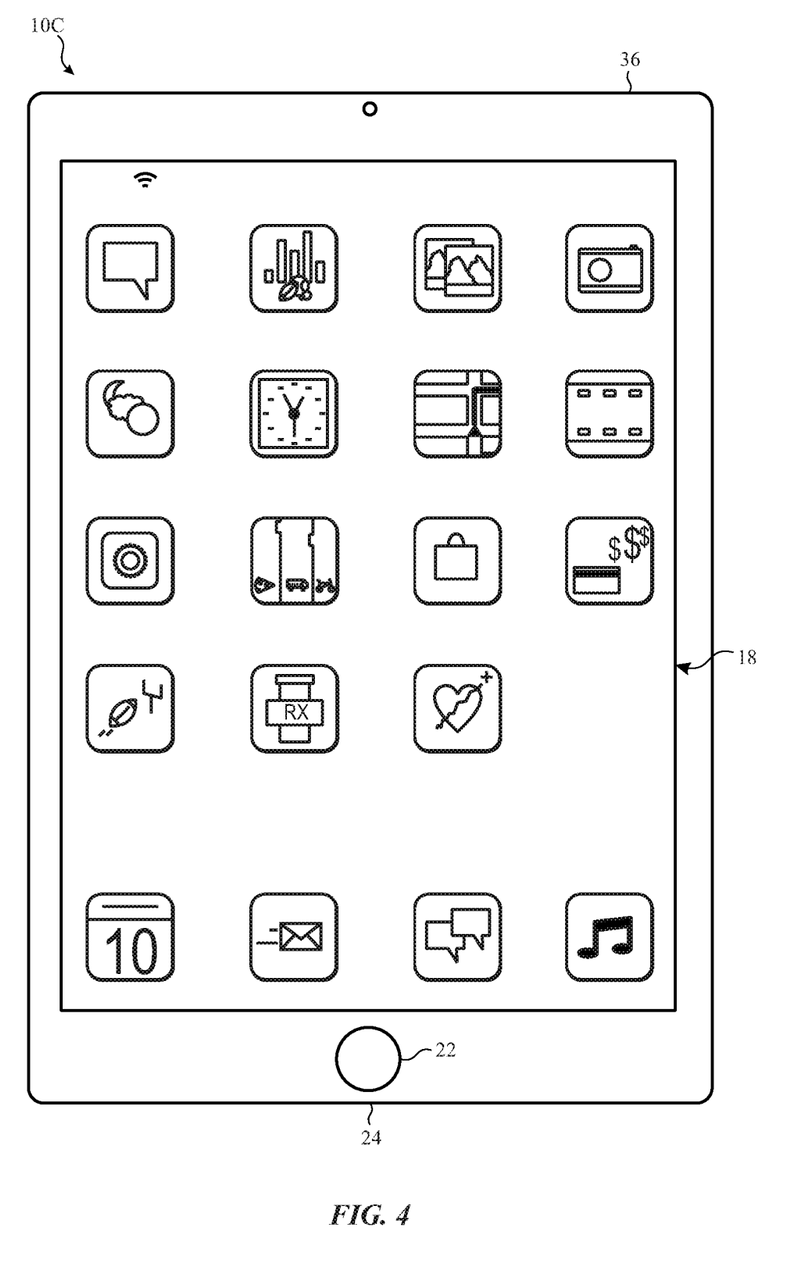
FIG. 4 is a front view of another hand-held device representing another embodiment of the electronic device of FIG. 1.
Figure 5:
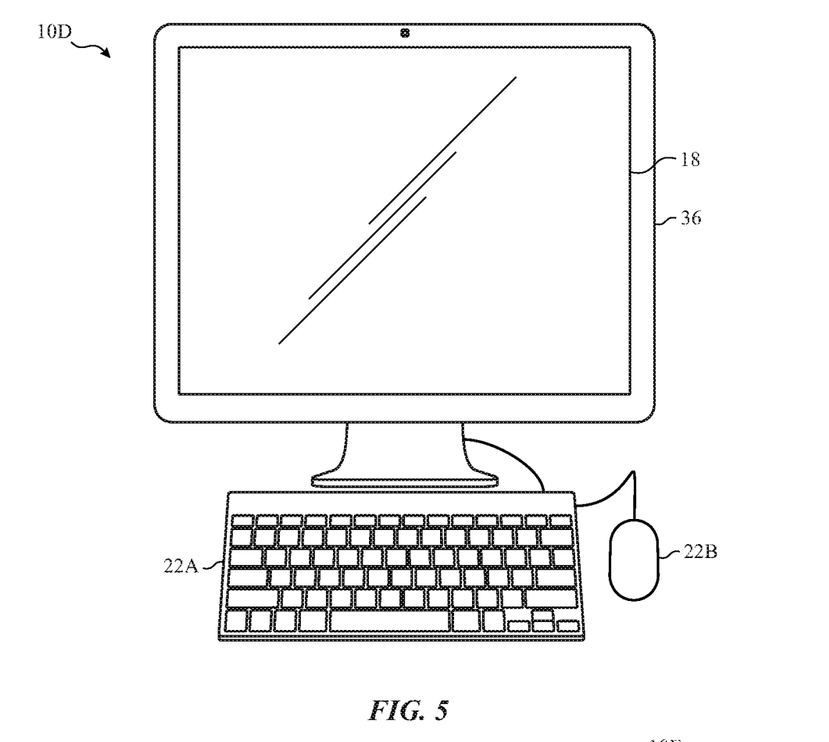
FIG. 5 is a front view of a desktop computer representing another embodiment of the electronic device of FIG. 1.
Figure 6:
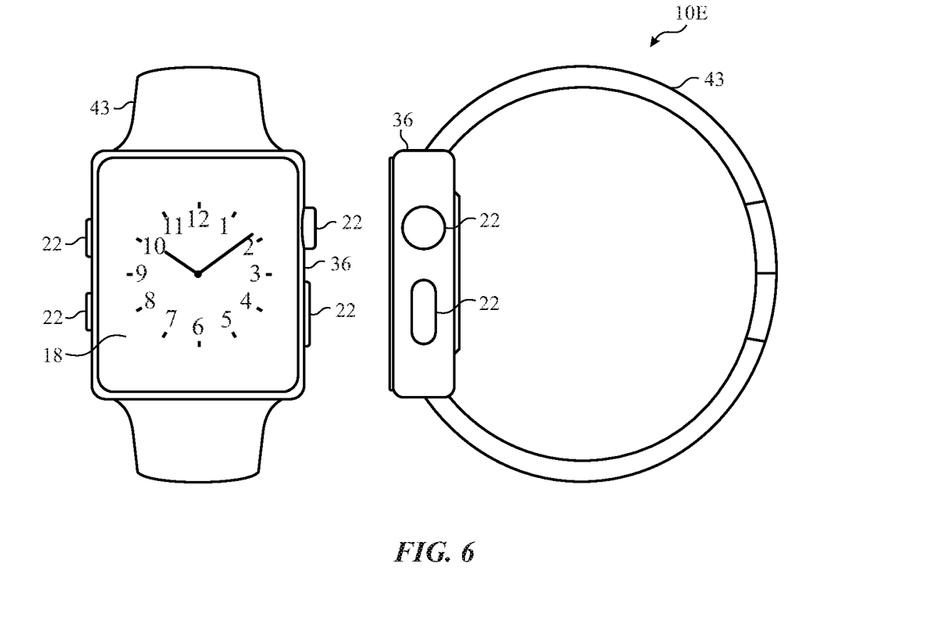
FIG. 6 is a front view and side view of a wearable electronic device representing another embodiment of the electronic device of FIG. 1.

With this in mind, a block diagram of an electronic device 10 is shown in FIG. 1. As will be described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or a similar device.

The electronic device 10 shown in FIG. 1 may include, for example, a processor core complex 12 (which may include one or more processors), a local memory 14, a main memory storage device 16, an electronic display 18, input structures 22, an input/output (I/O) interface 24, a network interface 26, and a power source 28. The various functional blocks shown in FIG. 1 may include hardware elements (including circuitry), software elements (including machine-executable instructions stored on a tangible, non-transitory medium, such as the local memory 14 or the main memory storage device 16) or a combination of both hardware and software elements. It should be noted that FIG. 1 is merely one example of a particular implementation and is intended to illustrate the types of components that may be present in electronic device 10. Indeed, the various depicted components may be combined into fewer components or separated into additional components. For example, the local memory 14 and the main memory storage device 16 may be included in a single component.

The processor core complex 12 may carry out a variety of operations of the electronic device 10. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application program) stored on a suitable article of manufacture, such as the local memory 14 and/or the main memory storage device 16. In addition to instructions for the processor core complex 12, the local memory 14 and/or the main memory storage device 16 may also store data to be processed by the processor core complex 12. By way of example, the local memory 14 may include random access memory (RAM) and the main memory storage device 16 may include read only memory (ROM), rewritable non-volatile memory such as flash memory, hard drives, optical discs, or the like.

The electronic display 18 may display image frames, such as a graphical user interface (GUI) for an operating system or an application interface, still images, or video content. The electronic display 18 may be a self-emissive display, such as an organic light emitting diodes (OLED) display, a micro-LED display, a micro-OLED type display, or a liquid crystal display (LCD) illuminated by a backlight. In some embodiments, the electronic display 18 may include a touch screen, which may allow users to interact with a user interface of the electronic device 10.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. The network interface 26 may include one or more baseband processors, one or more radio frequency transceivers, one or more antennas, and any other suitable components that enable the electronic device 10 to connect to a network, as further described in FIG. 7 below.

The network interface 26 may also include, for example, interfaces for a personal area network (PAN), such as a Bluetooth network, for a local area network (LAN) or wireless local area network (WLAN), such as an 802.11x Wi-Fi network, and/or for a wide area network (WAN), such as a cellular network. The network interface 26 may further include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra wideband (UWB), and so forth. The power source 28 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 10A, is illustrated in FIG. 2 according to embodiments of the present disclosure. The depicted computer 10A may include a housing or enclosure 36, an electronic display 18, input structures 22, and ports of an I/O interface 24. In one embodiment, the input structures 22 (such as a keyboard and/or touchpad) may be used to interact with the computer 10A, such as to start, control, or operate a GUI or applications running on computer 10A. For example, a keyboard and/or touchpad may allow a user to navigate a user interface or application interface displayed on the electronic display 18.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. of Cupertino, Calif. The handheld device 10B may include an enclosure 36 to protect interior components from physical damage and to shield them from electromagnetic interference. The enclosure 36 may surround the electronic display 18. The I/O interfaces 24 may open through the enclosure 36 and may include, for example, an I/O port for a hard-wired connection for charging and/or content manipulation using a standard connector and protocol, such as the Lightning connector provided by Apple Inc., a universal service bus (USB), or other similar connector and protocol.

User input structures 22, in combination with the electronic display 18, may allow a user to control the handheld device 10B. For example, the input structures 22 may activate or deactivate the handheld device 10B, navigate user interface to a home screen, a user-configurable application screen, and/or activate a voice-recognition feature of the handheld device 10B. Other input structures 22 may provide volume control, or may toggle between vibrate and ring modes. The input structures 22 may also include a microphone may obtain a user's voice for various voice-related features, and a speaker may enable audio playback and/or certain phone capabilities. The input structures 22 may also include a headphone input may provide a connection to external speakers and/or headphones.

FIG. 4 depicts a front view of another handheld device 10C, which represents another embodiment of the electronic device 10. The handheld device 10C may represent, for example, a tablet computer or portable computing device. By way of example, the handheld device 10C may be a tablet-sized embodiment of the electronic device 10, which may be, for example, a model of an iPad® available from Apple Inc. of Cupertino, Calif.

Turning to FIG. 5, a computer 10D may represent another embodiment of the electronic device 10 of FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. A similar enclosure 36 may be provided to protect and enclose internal components of the computer 10D such as the electronic display 18. In certain embodiments, a user of the computer 10D may interact with the computer 10D using various peripheral input devices, such as input structures 22A or 22B (e.g., keyboard and mouse), which may connect to the computer 10D.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple, Inc. However, in other embodiments, the wearable electronic device 10E may include any wearable electronic device such as, for example, a wearable exercise monitoring device (e.g., pedometer, accelerometer, heart rate monitor), or other device by another manufacturer. The electronic display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

While the present disclosure uses a cell phone, such as the handheld device 10B of FIG. 3, as an example, it should be understood that the techniques disclosed may also apply to any suitable communication device, such as the notebook computer 10A of FIG. 2, the handheld device 10C of FIG. 4, the desktop computer 10D of FIG. 5, the wearable electronic device 10E of FIG. 6, or a similar device. Moreover, while the present disclosure uses cell networks provided by cellular towers (also referred to as cell towers) as an example, it should be understood that the techniques disclosed may also apply to any suitable communication network provided by any suitable communication gateway, such as a personal area network (PAN), such as a Bluetooth network, a local area network (LAN) or wireless local area network (WLAN), such as an 802.11x Wi-Fi network, another type of wide area network (WAN), a broadband fixed wireless access networks (WiMAX), a mobile broadband Wireless networks (mobile WiMAX), or a similar network.

Figure 7:
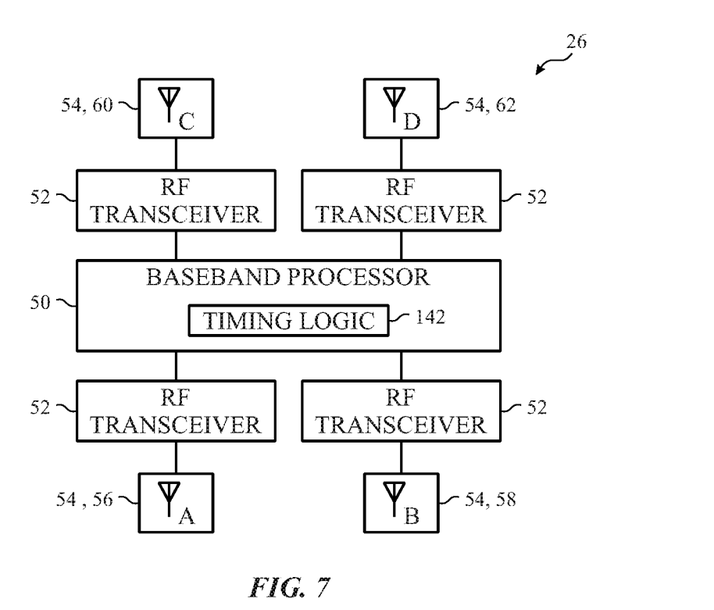
FIG. 7 illustrates a network interface of the electronic device of FIG. 1, according to embodiments of the present disclosure.

FIG. 7 illustrates the network interface 26 of the electronic device 10 of FIG. 1, according to embodiments of the present disclosure. The network interface 26 may include a baseband processor 50 that manages radio functions of the electronic device 10. In alternative embodiments, the baseband processor 50 may be part of the processor core complex 12. The network interface 26 may include one or more radio frequency transceivers 52 communicatively coupled to the baseband processor 50. The radio frequency transceivers 52 may transmit a radio wave and modulate the radio wave to carry data, and receive a radio wave and demodulate the radio wave to receive data in the radio wave. In some embodiments, the radio frequency transceivers 52 may include transmitters that transmit radio waves and modulate the radio waves to carry data, and receivers that receive radio waves and demodulate the radio waves to receive data in the radio waves.

Each radio frequency transceiver 52 may be communicatively coupled to an antenna 54, which may be an interface between radio waves propagating through space and electric currents moving in metal conductors. In particular, during transmission, the radio frequency transceiver 52 (or a radio frequency transmitter) may supply an electric current to the antenna's terminals, and the antenna 54 may radiate energy from the electric current as electromagnetic waves (radio waves). During reception, the antenna 54 may intercept at least some of the power of an electromagnetic wave to produce an electric current at its terminals that is applied to the radio frequency transceiver 52 (or a radio frequency receiver) to be amplified. In some embodiments, the network interface 26 may include radio frequency transmitters and receivers in place of the transceivers 52. Moreover, the network interface 26 may also include any other suitable components that enable the electronic device 10 to communicate with a network, such as full duplexers, half duplexers, power amplifiers, and similar components.

The antennas 54 may be capable of operating on a variety of frequency bands. For example, the four illustrated antennas 54 (a first antenna 56 (e.g., antenna or antenna port A), a second antenna 58 (e.g., antenna or antenna port B), a third antenna 60 (e.g., antenna or antenna port C), and a fourth antenna 62 (e.g., antenna or antenna port D)) of the network interface 26 may each be capable of operating at a middle frequency band (e.g., 1 gigahertz (GHz) to 2 GHz) and a high frequency band (e.g., greater than 2 GHz). For example, the middle frequency band may include the fourth generation (4G) Frequency Division Duplex (FDD) Long-Term Evolution (LTE) B2 band that operates at 1.9 GHz. The high frequency band may include 4G Time Division Duplex (TDD) LTE B38 band that operates at 2.6 GHz.

However, in some embodiments, some, but not all, of the antennas 54 may be capable of operating at a low frequency (e.g., less than 1 GHz). For example, the low frequency band may include Code Division Multiple Access (CDMA) BC0 band that operates at 800 MHz. That is, the first antenna 56 (e.g., antenna A) and the second antenna 58 (e.g., antenna B) may be capable of operating at the low frequency band. While four antennas are illustrated in FIG. 7, it should be understood that the disclosed techniques may be applied to any suitable number of antennas, such as two antennas, six antennas, eight antennas, or a similar number of antennas. Moreover, any configuration of antennas and their respective capabilities of operating on different frequency bands are contemplated.

Figure 8:
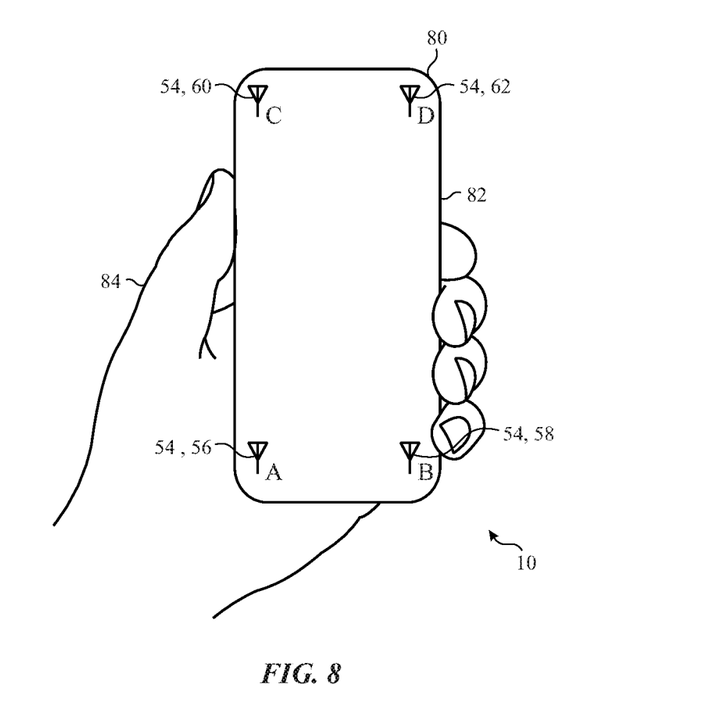
FIG. 8 illustrates antenna placement in the electronic device of FIG. 1, according to embodiments of the present disclosure.

With this in mind, FIG. 8 illustrates antenna placement in the electronic device 10 of FIG. 1, according to embodiments of the present disclosure. In particular, each of the antennas 54 may be placed in or near a corner 80 of the electronic device 10 to enable better transmission and/or reception of signals from and/or to the respective antenna 54. In alternative or additional embodiments, the antennas 54 may be placed in any other suitable location, such as at an edge 82 of the electronic device 10. As illustrated, in some cases, a user 84 may at least partially obstruct or cover an antenna 54, such as the first antenna 56 when using the electronic device 10. As such, transmission and/or reception of signals from and/or to the obstructed antenna 54, such as the first antenna 56, may suffer (compared to unobstructed antennas 58, 60, 62). Instead, selecting another antenna 54 that is capable of transmitting and/or receiving signals and unobstructed, such as the second antenna 58, may realize better performance and more effective communication.

Figure 9:
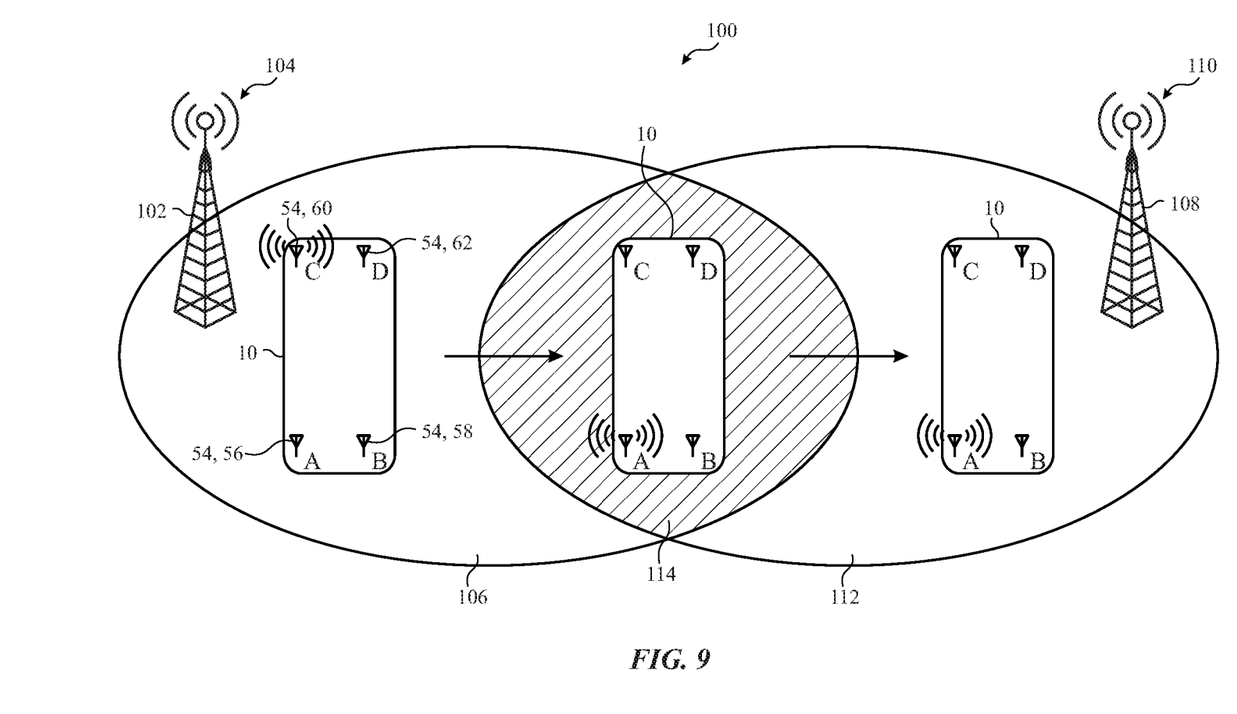
FIG. 9 illustrates a system that opportunistically selects an antenna of the electronic device of FIG. 1, according to embodiments of the present disclosure.

FIG. 9 illustrates a system 100 that opportunistically selects an antenna 54 of the electronic device 10 of FIG. 1, according to embodiments of the present disclosure. The system 100 includes a first communication gateway (e.g., a first cell tower 102) provides communication service (e.g., cellular service) at a first frequency 104 for a first service area 106. For example, the first frequency 104 may be within a middle or high frequency band. Using the example discussed above, the first antenna 56 (e.g., antenna A), the second antenna 58 (e.g., antenna B), the third antenna 60 (e.g., antenna C), and the fourth antenna 62 (e.g., antenna D) may each be capable of operating at the middle and high frequency bands. The system 100 also includes a second communication gateway (e.g., a second cell tower 108) provides cell service at a second frequency 110 for a second service area 112. For example, the second frequency 110 may be within a low frequency band. Using the example discussed above, the first antenna 56 and the second antenna 58 may be capable of operating at the low frequency band.

As illustrated, when initially in the first service area 106, the baseband processor 50 uses the third antenna 60 (e.g., antenna C) to connect the electronic device 10 to the first cell tower 102 at the first frequency 104 for cell service. As the electronic device 10 enters an overlapping area 114 that the first service area 106 overlaps with the second service area 112, the first cell tower 102 may "handover" the electronic device 10 to the second cell tower 108. That is, the electronic device 10 may transition from using the first cell service provided at the first frequency 104 by the first cell tower 102 in the first service area 106 to the second cell service provided at the second frequency 110 by the second cell tower 108 in the second service area 112. As such, the baseband processor 50 may receive an indication of a handover event and transition from using the third antenna 60 that is capable of connecting to the first frequency 104 to using the first antenna 56 or the second antenna 58 that is capable of connecting to the second frequency 110.

In response to receiving the indication of the handover event, the baseband processor 50 may determine signal measurements of the cell tower that the electronic device 10 is being handed over to for each antenna 54. In the above example, while the electronic device 10 is in the overlapping area 114 and using the third antenna 60 to connect to the first cell tower 102, the baseband processor 50 may determine signal measurements of the second cell tower 108 for the first antenna 56 or the second antenna 58. The signal measurements may include any suitable measurement that is associated with performance of the cell tower that the electronic device 10 is being handed over to with respect to an antenna 54 of the electronic device 10, such as signal power measurements (e.g., Reference Signal Strength Indicator (RSSI) measurements, such as Reference Signal Received Power (RSRP) measurements), signal quality measurements (e.g., Reference Signal Received Quality (RSRQ) measurements) or similar measurements.

The baseband processor 50 may then select and use the antenna 54 that has the best performing signal measurements. For example, if the baseband processor 50 may select and use the antenna 54 that has the best performing (e.g., greatest or highest) Reference Signal Received Power (RSRP) measurement. In some embodiments, the baseband processor 50 may take multiple measurements (e.g., RSRP measurements) for the same antenna, apply a function (e.g., mean, median, maximum, minimum, or a similar function) to the multiple measurements to realize a resulting value, and compare the value to other values of other multiple measurements of other antennas 54. Moreover, the baseband processor 50 may select and use the antenna 54 based on a combination of measurements, such as signal power measurements, signal quality measurements, and/or similar measurements. The present disclosure contemplates any suitable weighting of each measurement of the combination of measurements. In this manner, the system 100 may opportunistically select an antenna 54 of the electronic device 10 to connect to the second cell tower 108 for better performance and more effective communication when compared to arbitrarily selecting an antenna 54 to connect to the second cell tower 108.

Figure 10:
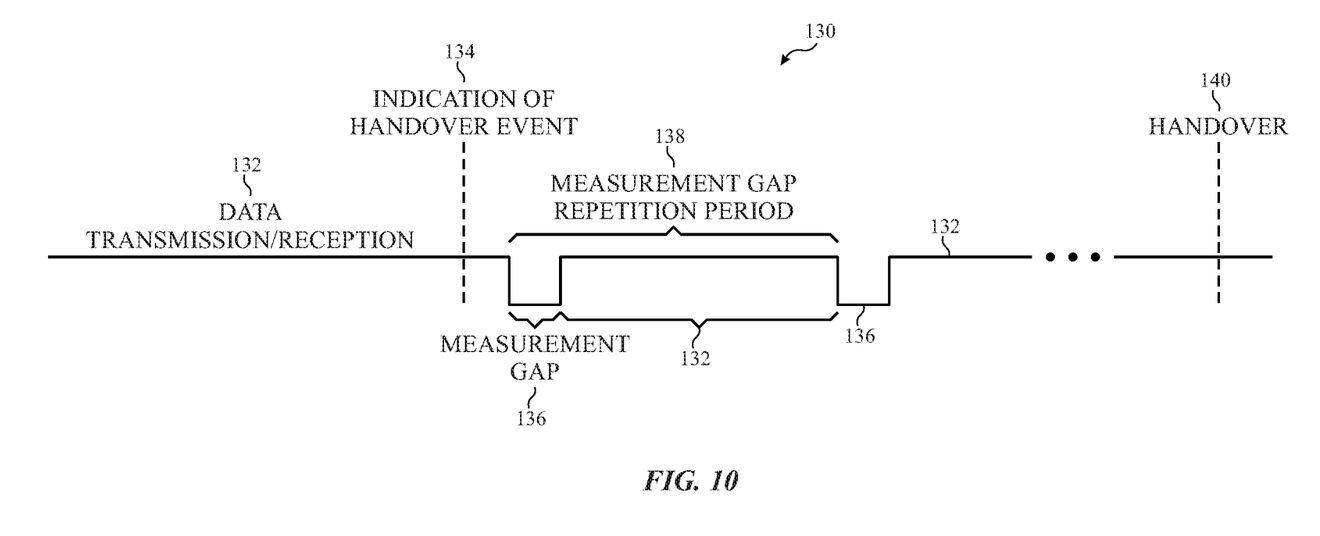
FIG. 10 illustrates an example high level timing diagram for determining the signal measurements of a cell tower that the electronic device of FIG. 1 is being handed over to with respect to antennas of the electronic device, according to embodiments of the present disclosure.

FIG. 10 illustrates an example high level timing diagram 130 for determining the signal measurements of the cell tower that the electronic device 10 of FIG. 1 is being handed over to with respect to the antennas 54 of the electronic device 10, according to embodiments of the present disclosure. Before the baseband processor 50 receives an indication of a handover event, the electronic device 10 may be operating "normally" during a normal operation period 132. That is, the electronic device 10 may transmit data, receive data, perform intra-frequency signal measurements (e.g., perform signal quality and/or signal power of a connected first cell tower 102 providing cell service at a first frequency 104 for antennas 54 capable of operating at the first frequency 104), and/or perform other suitable non-handover related operations. As an example, the electronic device 10 may be in the first service area 106 and connect to the first cell tower 102 to use the first cell service of FIG. 9.

The baseband processor 50 may then receive an indication of a handover event 134. For example, the electronic device 10 may enter the overlapping area 114 where cell service is provided by both the first cell tower 102 and the second cell tower 108 of FIG. 9. The indication of the handover event may thus include an indication that the electronic device 10 is in the overlapping area 114 where cell service may be provided by multiple cell towers.

In response to receiving the indication of the handover event 134, the baseband processor 50 may determine signal measurements of the cell tower that the electronic device 10 is being handed over to for each antenna 54 capable of operating at the frequency of the cell service provided by the cell tower in a measurement gap time period 136. For example, as illustrated in FIG. 9, the electronic device 10 is being handed over to the second cell tower 108, which provides the second cell service at the second frequency 110 (e.g., within a low frequency band). Using the example discussed above, the first antenna 56 and the second antenna 58 of the electronic device 10 may be capable of operating at the low frequency band. As such, the baseband processor 50 may determine, for example, Reference Signal Received Power (RSRP) measurements for the second cell tower 108 using the first antenna 56 and the second antenna 58 in the measurement gap 136.

In particular, the electronic device 10 may switch from connecting to the first cell tower 102 (e.g., using the third antenna 60 (antenna C)) to connecting to the second cell tower 108 using the first antenna 56 and connecting to the second cell tower 108 using the second antenna 58 in the measurement gap 136. The baseband processor 50 may determine signal measurements while connected to the second cell tower 108 using the first antenna 56 and determine signal measurements while connected to the second cell tower 108 using the second antenna 58 in the measurement gap 136. The baseband processor 50 may determine the signal measurements in a single measurement gap 136 or multiple measurement gaps 136. In some embodiments, the baseband processor 50 may determine a first set of signal measurements for multiple antennas 54 in a first measurement gap 136, a second set of signal measurements for the multiple antennas 54 in a second measurement gap 136, a third set of signal measurements for multiple antennas 54 in a third measurement gap 136, and so on. The baseband processor 50 may then apply a function (e.g., mean, median, maximum, minimum, or a similar function) to the multiple measurements to realize a resulting value, and compare the value to other values of other multiple measurements of other antennas 54. The measurement gap 136 may be a sufficiently small period of time (e.g., in the range 1-10 milliseconds (ms), such as 2 ms, 4 ms, 6 ms 8 ms, or a similar period of time) that the signal measurements may be performed without substantial interruption of cell service or such that a user operating the electronic device 10 would not notice the baseband processor 50 ceasing normal operation (e.g., of a cellular phone call) during the measurement gap 136.

If the baseband processor 50 determines the signal measurements in multiple measurement gaps 136, the signal measurements may be performed once for each measurement gap repetition period 138. The measurement gap 136, measurement gap repetition period 138, number of measurement gaps 136, and any other suitable parameter associated with the signal measurements, may be determined at least in part by timing logic 142 of the baseband processor 50. The timing logic 142 may be implemented in any suitable manner, such as in software instructions, firmware instructions, hardware and/or circuitry, or any combination of these. In some embodiments, the timing logic 142 may be external to the baseband processor 50, but still be communicatively coupled to the radio frequency transceivers 52. The measurement gap 136, measurement gap repetition period 138, number of measurement gaps 136, and any other suitable parameter associated with the signal measurements, may be set by a configuration message (e.g., a radio resource control (RRC) connection reconfiguration message) sent by a cell tower, such as the second cell tower 108, and received by the baseband processor 50 via the radio frequency transceivers 52 and the antennas 54.

In some embodiments, the cell tower and/or the cellular network may operate under the 3rd Generation Partnership Project (3GPP) Long Term Evolution (LIE) specification, and include an E-UTRAN Node B or Evolved Node B (EnodeB). For example, the EnodeB of the second cell tower 108 may send an RRC message to the baseband processor 50 indicating the measurement gap 136, the measurement gap repetition period 138, number of measurement gaps 136, and any other suitable parameter associated with the signal measurements. In response, the baseband processor 50 may determine the signal measurements based on the measurement gap 136, the measurement gap repetition period 138, number of measurement gaps 136, and any other suitable parameter associated with the signal measurements received from the EnodeB of the second cell tower 108, and send an RRC message to the EnodeB of the second cell tower 108 that reports results of the signal measurements. The baseband processor 50 may then opportunistically select an antenna 54 to connect to the second cell tower 108 based on the signal measurements.

Figure 11:
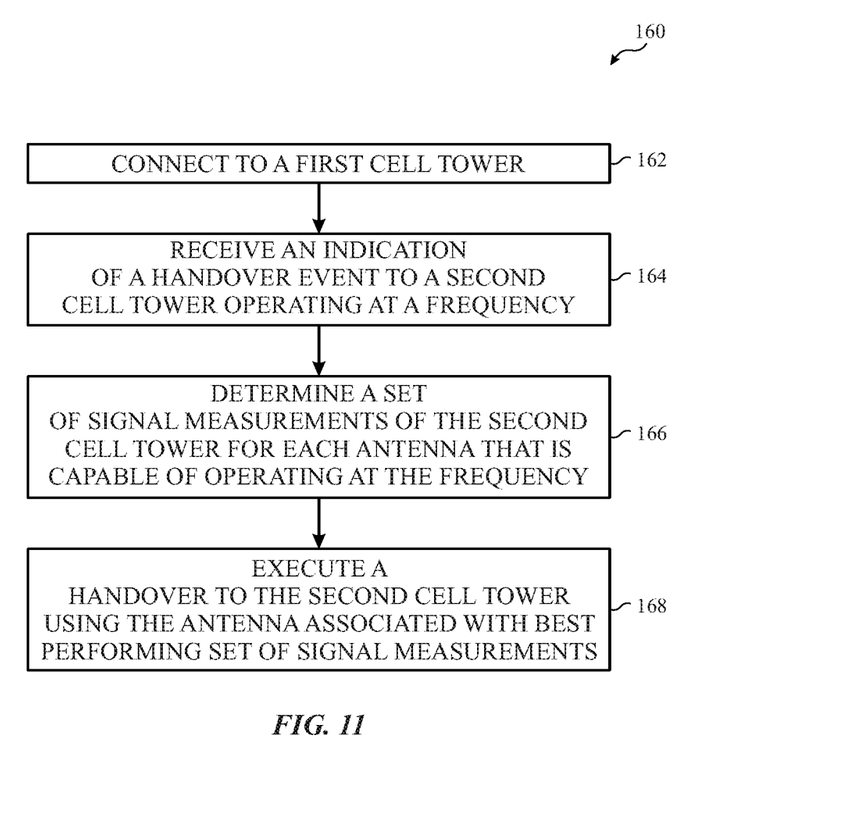
FIG. 11 is a flow diagram of a process that opportunistically selects an antenna of the electronic device of FIG. 1, according to embodiments of the present disclosure.

With the preceding in mind, FIG. 11 is a flow diagram of a process 160 that opportunistically selects an antenna 54 of the electronic device 10 of FIG. 1, according to embodiments of the present disclosure. The process 160 may be in the form of firmware stored on the network interface 26 that includes instructions that are executed by at least one suitable processor of a computer system, such as the baseband processor 50 of the electronic device 10. The illustrated process 160 is merely provided as an example, and in other embodiments, certain illustrated steps of the process 160 may be performed in other orders, skipped, or repeated, according to embodiments of the present disclosure. Moreover, the steps of the process 160 may be stored on any suitable media in addition to or in the alternative from the firmware of the network interface 26, such as the local memory 14 of the electronic device 10, the main memory storage device 16 of the electronic device 10, or a similar device. Similarly, the steps of the process 160 may be performed by any suitable device in addition to or in the alternative from the baseband processor 50, such as the processor core complex 12 of the electronic device 10, or a similar device.

As illustrated, in process block 162, the baseband processor 50 may connect to a first cell tower operating at a first frequency. For example, as illustrated in FIG. 9, the electronic device 10 may be in the first service area 106, and the baseband processor 50 may connect to the first cell tower 102 operating at the first frequency 104 using the third antenna 60 (antenna C) to use the first cell service. As such, the electronic device 10 may transmit data, receive data, perform intra-frequency signal measurements (e.g., perform signal quality and/or signal power of the first cell tower 102, and/or perform other suitable non-handover related operations.

In process block 164, the baseband processor 50 may receive an indication of a handover event to a second cell tower operating at a second frequency. For example, the electronic device 10 may enter the overlapping area 114 where cell service is provided by both the first cell tower 102 at the first frequency 104 and the second cell tower 108 at the second frequency 110 of FIG. 9. The baseband processor 50 may thus receive an indication of the handover event (e.g., an indication that the electronic device 10 is in the overlapping area 114 where cell service may be provided by both the first cell tower 102 and the second cell tower 108).

In process block 166, the baseband processor 50 may determine a set of signal measurements of the second cell tower for each antenna 54 that is capable of operating at the second frequency. For example, in response to receiving the indication of the handover event 134, the baseband processor 50 may determine a set of signal measurements of the second cell tower 108 for each antenna 54 capable of operating at the frequency of the cell service provided by the cell tower in a measurement gap time period 136. In the example discussed in FIG. 9, the electronic device 10 is being handed over to the second cell tower 108, which provides the second cell service at the second frequency 110 (e.g., within a low frequency band). Because the first antenna 56 (antenna A) and the second antenna 58 (antenna B) of the electronic device 10 may be capable of operating at the low frequency band, the baseband processor 50 may determine signal measurements (e.g., Reference Signal Received Power measurements) for the second cell tower 108 using the first antenna 56 and the second antenna 58. In particular, the electronic device 10 may switch from connecting to the first cell tower 102 (e.g., using the third antenna 60 (antenna C)) to connecting to the second cell tower 108 using the first antenna 56 to determine a first set of signal measurements and connecting to the second cell tower 108 using the second antenna 58 to determine a second set of signal measurements.

In process block 168, the baseband processor 50 may execute a handover to the second cell tower using the antenna 54 associated with the best performing signal measurements. In some embodiments, the baseband processor 50 may determine multiple signal measurements for each antenna 54 that is capable of operating at the second frequency 110. The baseband processor 50 may subsequently apply a function (e.g., mean, median, maximum, minimum, or a similar function) to the multiple measurements to realize a resulting value, and compare the value to other values of other multiple measurements of other antennas 54. In the above example, the baseband processor 50 may determine that the signal measurements (e.g., the RSRP measurements) using the second antenna 58 are better performing (e.g., greater) than the signal measurements using the first antenna 56. This may be because of a variety of reasons, including that components of the first antenna 56 are faulty, that the first antenna 56 is obstructed (e.g., by a user's hand 84 as shown in FIG. 8), or a similar reason. As such, the baseband processor 50 may execute the handover to the second cell tower 108 using the second antenna 58.

In cases where the first antenna that is used to connect to the first cell tower is also capable of connecting to the second cell tower, the baseband processor 50 may not switch antennas 54. For example, the first cell tower may provide the first cell service at a first frequency that is within a low frequency band, and the second cell tower may provide the second cell service at a second frequency that is within a middle or high frequency band. As such, the baseband processor 50 may initially connect to the first cell tower using the first antenna 56 (antenna A), and receive an indication of a handover event to the second cell tower. Because each of the four antennas 54 of the electronic device 10 may operate at the second frequency, the baseband processor 50 may determine signal measurements for each of the four antennas 54 (including the first antenna 56), and select the best performing antenna 54 of the four antennas 54. If the first antenna 56 is the best performing antenna 54, then the baseband processor 50 may select the first antenna 56 and execute the handover to the second cell tower using the same first antenna 56.

In some embodiments, if the first antenna that is used to connect to the first cell tower is also capable of connecting to the second cell tower, the baseband processor 50 may only switch antennas 54 to a different, better performing antenna 54 of the electronic device 10 if the signal measurements of the different, better performing antenna 54 exceed a threshold value beyond the signal measurements of the first antenna. Using the above example, the first cell tower may provide the first cell service at a first frequency that is within a low frequency band, and the second cell tower may provide the second cell service at a second frequency that is within a middle or high frequency band. As such, the baseband processor 50 may initially connect to the first cell tower using the first antenna 56 (antenna A), and receive an indication of a handover event to the second cell tower. Because each of the four antennas 54 of the electronic device 10 may operate at the second frequency, the baseband processor 50 may determine signal measurements for each of the four antennas 54 (including the first antenna 56). If the first antenna 56 is the best performing antenna 54, then the baseband processor 50 may select the first antenna 56 and execute the handover to the second cell tower using the same first antenna 56. If the first antenna 56 is not the best performing antenna 54 (e.g., the second antenna 58), then the baseband processor 50 may select the best performing antenna 54 if its signal measurements exceed a threshold value beyond the signal measurements of the first antenna 56 and execute the handover to the second cell tower using the best performing antenna 54. The first antenna 56 may not the best performing antenna 54 for a variety of reasons, including that components of the first antenna 56 are faulty, that the first antenna 56 is obstructed (e.g., by a user's hand 84 as shown in FIG. 8), or a similar reason.

In this manner, the process 160 may opportunistically selects an antenna 54 of the electronic device 10 to connect to the second cell tower 108 for better performance and more effective communication when compared to arbitrarily selecting an antenna 54 to connect to the second cell tower 108.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system comprising:
    an electronic device comprising:
        a plurality of antennas comprising a first antenna configured to operate at a first frequency, a second antenna configured to operate at a second frequency, and a third antenna configured to operate at the second frequency; and
        a processor configured to:
            communicatively couple to a first base station operating at the first frequency using the first antenna;
            receive an indication of a handover event to communicatively couple to a second base station operating at the second frequency from the first base station operating at the first frequency;
            determine one or more measurement gaps during normal operation of the electronic device in response to receiving the indication of the handover event from the first base station to the second base station;
            determine a first set of signal measurements of the second antenna when communicatively coupled to the second base station operating at the second frequency and a second set of signal measurements of the third antenna when communicatively coupled to the second base station operating at the second frequency during the one or more measurement gaps;
            execute the handover event from the first base station operating at the first frequency using the first antenna to the second base station operating at the second frequency using the second antenna in response to determining that the first set of signal measurements are better performing than the second set of signal measurements; or
            execute the handover event from the first base station operating at the first frequency using the first antenna to the second base station operating at the second frequency using the third antenna in response to determining that the second set of signal measurements are better performing than the first set of signal measurements.

2. The system of claim 1, wherein the first set of signal measurements comprises a signal power measurement, a signal quality measurement, or a combination thereof.

3. The system of claim 2, wherein the processor is configured to determine that the first set of signal measurements is better performing than the second set of signal measurements when:
    a first signal power measurement of the first set of signal measurements is greater than a second signal power measurement of the second set of signal measurements;
    a first signal quality measurement of the first set of signal measurements is greater than a second signal quality measurement of the second set of signal measurements; or
    a combination thereof.

4. The system of claim 1, wherein the processor comprises timing logic, wherein the timing logic is configured to determine the one or more measurement gaps during normal operation of the electronic device in response to receiving the indication of the handover event from the first base station to the second base station, wherein the processor is configured to determine at least some of the first set of signal measurements and the second set of signal measurements during a same measurement gap.

5. The system of claim 4, wherein the timing logic is configured to determine a measurement gap repetition period, wherein the processor is configured to determine at least some of the first set of signal measurements and the second set of signal measurements once every measurement gap repetition period during normal operation of the electronic device.

6. The system of claim 4, wherein the timing logic is configured to determine a number of measurement gaps of the one or more measurement gaps during which the processor is configured to determine the first set of signal measurements and the second set of signal measurements.

7. The system of claim 6, wherein the processor is configured to determine that the first set of signal measurements is better performing than the second set of signal measurements by determining that a first average of the first set of signal measurements over the number of measurement gaps is better performing than a second average of the second set of signal measurements over the number of measurement gaps.

8. An electronic device comprising:
    a plurality of antennas comprising a first antenna, a second antenna, and a third antenna; and
    a processor communicatively coupled to the plurality of antennas, wherein the processor is configured to:

receive an indication of handing over cellular service provided from a first base station at a first frequency band through the first antenna to a second base station at a second frequency band;

determine a measurement gap during normal operation of the electronic device in response to receiving the indication of handing over the cellular service provided from the first base station to the second base station, wherein the electronic device ceases the normal operation of the electronic device in the measurement gap;

determine a first set of signal measurements of the second base station using the second antenna in the measurement gap;

determine a second set of signal measurements of the second base station using the third antenna in the measurement gap; and hand over the cellular service from the first base station through using the first antenna to the second base station using the second antenna when the first set of signal measurements are better performing than the second set of signal measurements.

9. The electronic device of claim 8, wherein the processor is configured to hand over the cellular service from the first base station through the first antenna to the second base station using the third antenna when the second set of signal measurements are better performing than the first set of signal measurements.

10. The electronic device of claim 8, wherein the second antenna and the third antenna are configured to operate in the first frequency band and the second frequency band.

11. The electronic device of claim 8, wherein the first frequency band does not comprise the second frequency band.

12. The electronic device of claim 8, wherein:
the plurality of antennas comprises a fourth antenna; and
the processor is configured to:
determine a third set of signal measurements of the second base station using the fourth antenna in the measurement gap; and
hand over the cellular service from the first base station through the first antenna to the second base station using the fourth antenna when the third set of signal measurements are better performing than the first set of signal measurements and the second set of signal measurements.

13. The electronic device of claim 12, wherein the processor is configured to use cellular service provided from the first base station at the first frequency band through the first antenna while determining the first set of signal measurements, determining the second set of signal measurements, and handing over the cellular service from the first base station through the first antenna to the second base station.

14. The electronic device of claim 8, wherein the first base station is configured to provide the cellular service at the first frequency band to a first area, wherein the second base station is configured to provide the cellular service at the second frequency band to a second area, wherein the indication is received while the electronic device is located in an overlapping area of the first area and the second area.

15. The electronic device of claim 8, wherein the first frequency band comprises first frequencies less than 1 GigaHertz (GHz), and wherein the second frequency band comprises second frequencies greater than 1 GHz.

16. The electronic device of claim 8, wherein the first antenna is configured to operate in the first frequency band and the second frequency band.

17. The electronic device of claim 16, wherein the processor is configured to:
determine a third set of signal measurements of the second base station using the first antenna in the measurement gap; and
hand over the cellular service from the first base station through the first antenna to the second base station using the first antenna when the third set of signal measurements are better performing than the first set of signal measurements and the second set of signal measurements.

18. The electronic device of claim 8, comprising a plurality of transceivers coupled to the plurality of antennas, wherein:
a first transceiver is coupled to the first antenna;
a second transceiver is coupled to the second antenna; and
a third transceiver is coupled to the third antenna.

19. A method for opportunistically selecting an antenna of an electronic device to connect to a cellular tower comprising:
connecting, via a processor, to a first cellular tower operating at a first frequency using a first antenna of the electronic device;
receiving, via the processor, an indication of a handover event to a second cellular tower operating at a second frequency, wherein the first antenna does not operate at the second frequency;
in response to receiving the indication of the handover event to the second cellular tower operating at the second frequency, determining, via the processor, a set of signal measurements of the second cellular tower during one or more measurement gaps for each antenna of the electronic device that is capable of operating at the second frequency; and
executing, via the processor, a handover to the second cellular tower using the antenna associated with the best performing set of signal measurements.

20. The method of claim 19, wherein determining, via the processor, the set of signal measurements of the second cellular tower during one or more measurement gaps for each antenna of the electronic device that is capable of operating at the second frequency comprises switching to each antenna of the electronic device to determine the set of signal measurements of the second cellular tower for a respective antenna.

* * * * *